United States Patent
Suzuki et al.

(10) Patent No.: US 12,479,683 B2
(45) Date of Patent: Nov. 25, 2025

(54) REEL ATTACHING/DETACHING DEVICE AND FEEDER PREPARATION SYSTEM

(71) Applicant: FUJI CORPORATION, Chiryu (JP)

(72) Inventors: Daiki Suzuki, Toyokawa (JP); Masataka Iwasaki, Anjo (JP)

(73) Assignee: FUJI CORPORATION, Chiryu (JP)

( * ) Notice: Subject to any disclaimer, the term of this patent is extended or adjusted under 35 U.S.C. 154(b) by 498 days.

(21) Appl. No.: 17/906,836

(22) PCT Filed: Apr. 1, 2020

(86) PCT No.: PCT/JP2020/015020
§ 371 (c)(1),
(2) Date: Sep. 20, 2022

(87) PCT Pub. No.: WO2021/199375
PCT Pub. Date: Oct. 7, 2021

(65) Prior Publication Data
US 2023/0365368 A1    Nov. 16, 2023

(51) Int. Cl.
*B65H 19/10* (2006.01)
*H05K 13/02* (2006.01)
*H05K 13/04* (2006.01)

(52) U.S. Cl.
CPC ......... *B65H 19/105* (2013.01); *H05K 13/021* (2013.01); *H05K 13/0417* (2013.01); *B65H 2301/418* (2013.01)

(58) Field of Classification Search
CPC ............ B65H 19/105; B65H 2301/418; B65H 19/12; B65H 2405/422; B65H 2801/81; B65H 2553/42; B65H 19/123; B25J 9/162; B25J 9/1687; B25J 9/1697; B65B 35/10; B65B 35/30; B65B 35/56; B65B 57/14;

(Continued)

(56) References Cited

U.S. PATENT DOCUMENTS

2020/0214182 A1* 7/2020 Motowaki ................ B25J 11/00

FOREIGN PATENT DOCUMENTS

JP       5-175686 A       7/1993
JP       2017-216379 A    12/2017

(Continued)

OTHER PUBLICATIONS

International Search Report issued Jun. 30, 2020, in PCT/JP2020/015020 filed on Apr. 1, 2020, 2 pages.

*Primary Examiner* — Bao Long T Nguyen
(74) *Attorney, Agent, or Firm* — Oblon, McClelland, Maier & Neustadt, L.L.P.

(57) ABSTRACT

A reel attaching/detaching device that attaches/detaches a reel on which a tape accommodating a component is wound to and from a feeder which feeds out the tape by a drive of a feed-out section and supplies the component, the device includes a feeder set unit configured to be set in a predetermined orientation when the feeder supplies the component, a reel set unit configured to be set in a predetermined orientation when the reel supplies the component, a transfer robot configured to transfer the reel between the feeder set unit and the reel set unit while holding a orientation of the reel, and a control device configured to control the transfer robot so that the reel is detached from the reel set unit and the reel is attached to the feeder set in the feeder set unit, when the reel is set in the reel set unit.

5 Claims, 10 Drawing Sheets

(58) Field of Classification Search
CPC ............ H05K 13/021; H05K 13/0417; G05B 19/41895
See application file for complete search history.

(56) References Cited

FOREIGN PATENT DOCUMENTS

| | | |
|---|---|---|
| JP | 2019-204858 A | 11/2019 |
| WO | WO 2020/039495 A1 | 2/2020 |

* cited by examiner

REEL ATTACHING/DETACHING DEVICE AND FEEDER PREPARATION SYSTEM

TECHNICAL FIELD

The present specification discloses a reel attaching/detaching device and a feeder preparation system.

BACKGROUND ART

Conventionally, there has been proposed a method of automatically attaching/detaching a reel on which a tape accommodating components is wound from a feeder. For example, Patent Literature 1 discloses a tape exchanging system including a feeder conveyance mechanism for conveying a feeder and a parallel link robot provided above the feeder conveyance mechanism. In addition, the feeder conveyance mechanism conveys the feeder in a tilted orientation such that a reel attaching surface of the feeder is directed upward so that the parallel link robot can perform the reel exchange operation from above. As a result, it is assumed that the exchange operation of the reel can be automatically performed without bothering the operator.

PATENT LITERATURE

Patent Literature 1: JP-A-2019-204858

BRIEF SUMMARY

Technical Problem

Promoting the automation of the exchange operation of the reels as described above can be regarded as an important issue in order to improve the production efficiency. However, in the above-described system, unlike a predetermined orientation when the feeder supplies the component, since the work is performed in an orientation in which the feeder is tilted so that a reel attaching surface is directed upward, the component accommodated in the tape may also fall off. Therefore, even when the feeder to which the reel is attached is placed in a predetermined orientation, the components accommodated in the tape may not return to a correct orientation. In addition, the components accommodated in the tape may fall off while the feeder and the reel are in a tilted orientation. In such a case, the feeder cannot appropriately supply the components, so that the production efficiency may be reduced.

The main object of the present disclosure is to more appropriately perform attaching/detaching of a reel in a case where the attaching/detaching of the reel is automatically performed to and from a feeder using a robot.

Solution to Problem

The present disclosure adopts the following means to achieve the main object described above.

It is a gist that a reel attaching/detaching device of the present disclosure is a reel attaching/detaching device that attaches/detaches a reel on which a tape accommodating a component is wound to and from a feeder which feeds out the tape by a drive of a feed-out section and supplies the component, the device including a feeder set unit configured to be set in a predetermined orientation when the feeder supplies the component, a reel set unit configured to be set in a predetermined orientation when the reel supplies the component, a transfer robot configured to transfer the reel between the feeder set unit and the reel set unit while holding an orientation of the reel, and a control device configured to control the transfer robot so that the reel is detached from the reel set unit and the reel is attached to the feeder set in the feeder set unit, when the reel is set in the reel set unit.

In the reel attaching/detaching device of the present disclosure, the feeder is set in the feeder set unit in the predetermined orientation when the component is supplied, and the reel is set in the reel set unit in the predetermined orientation. In addition, the transfer robot can transfer the reel between the feeder set unit and the reel set unit while holding the orientation of the reel. Therefore, since it is not necessary to tilt the reel or the feeder, it is possible to prevent the orientation of the component accommodated in the tape from significantly changing or the component from falling off. Therefore, in the case where the attaching/detaching of the reel is automatically performed to and from the feeder using the transfer robot, it is possible to more appropriately perform the attaching/detaching of the reel.

DESCRIPTION OF EMBODIMENTS

Figure 1:
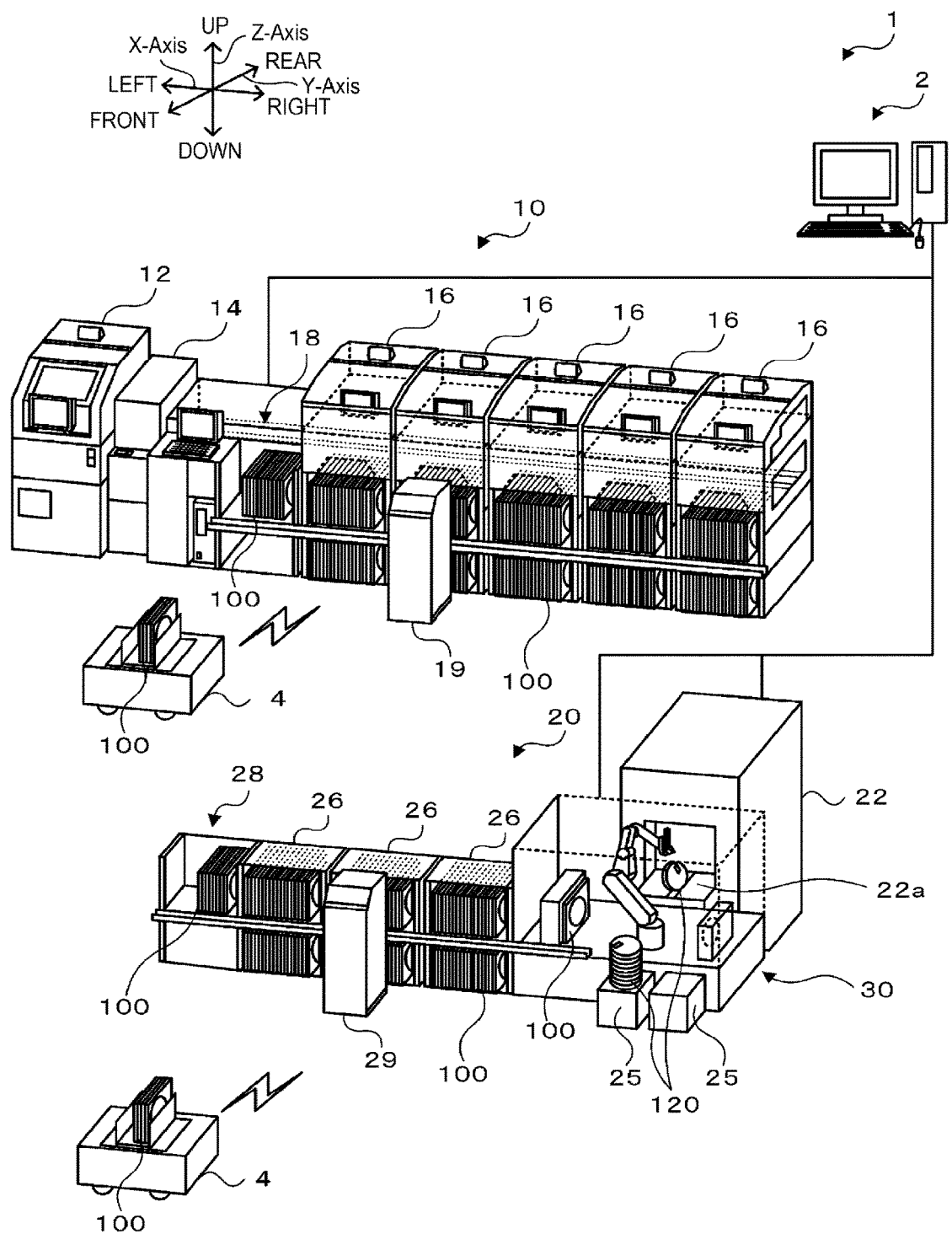
FIG. 1 is a schematic configuration diagram of component mounting system 1.

Next, embodiments of the present disclosure will be described with reference to the drawings. FIG. 1 is a schematic configuration diagram of component mounting system 1 of the present embodiment. Component mounting system 1 is provided with mounting line 10 for mounting a component on a board, preparation line 20 for preparing the supply of the component, and management device 2 for managing the entire system, and these devices are installed in a factory or the like. Management device 2 is configured as a computer including CPU, ROM, RAM, and HDD (not illustrated), outputs information and instructions related to mounting to each device of mounting line 10, and outputs information and instructions related to preparation to each device of preparation line 20. In the present embodiment, a left-right direction (X-axis), a front-rear direction (Y-axis), and an up-down direction (Z-axis) are as illustrated in FIG. 1.

As illustrated in FIG. 1, mounting line 10 is provided with printing device 12 for printing solder on board, printing inspection device 14 for inspecting the state of the printed solder, and mounting device 16 for mounting the component on the board. Multiple mounting devices 16 are installed side by side along the conveyance direction of the board (X-axis direction), and multiple feeders 100 for supplying components can be mounted on a front surface. Each mounting device 16 is configured to pick up the component supplied from mounted feeder 100 and mount the component on the board. In addition, mounting line 10 is provided with feeder storage location 18 installed between mounting device 16 and printing inspection device 14 on the most upstream side in the conveyance direction of the board among multiple mounting devices 16, and loader 19 that moves front of multiple mounting devices 16 and front of feeder storage location 18 along the conveyance direction of the board. Automated guided vehicle (AGV) 4 or the operator accommodates feeder 100 necessary for feeder storage location 18, and collects unnecessary feeder 100 from feeder storage location 18. In addition, loader 19 is configured to take out necessary feeder 100 from feeder storage location 18 and provide feeder 100 to mounting device 16, or to collect unnecessary feeder 100 from each mounting device 16 and return feeder 100 to feeder storage location 18. Mounting line 10 may be provided with a reflow device or the like that performs a reflow process of the board on which the component is mounted.

Figure 2:
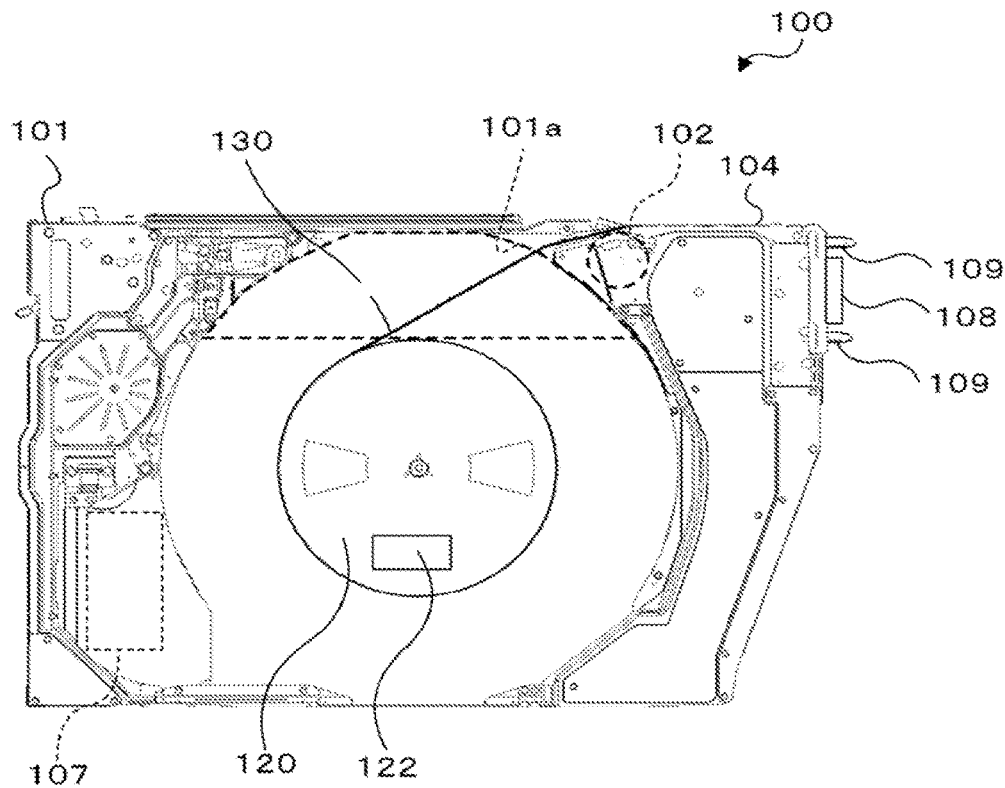
FIG. 2 is a schematic configuration diagram of feeder 100.
Figure 3:
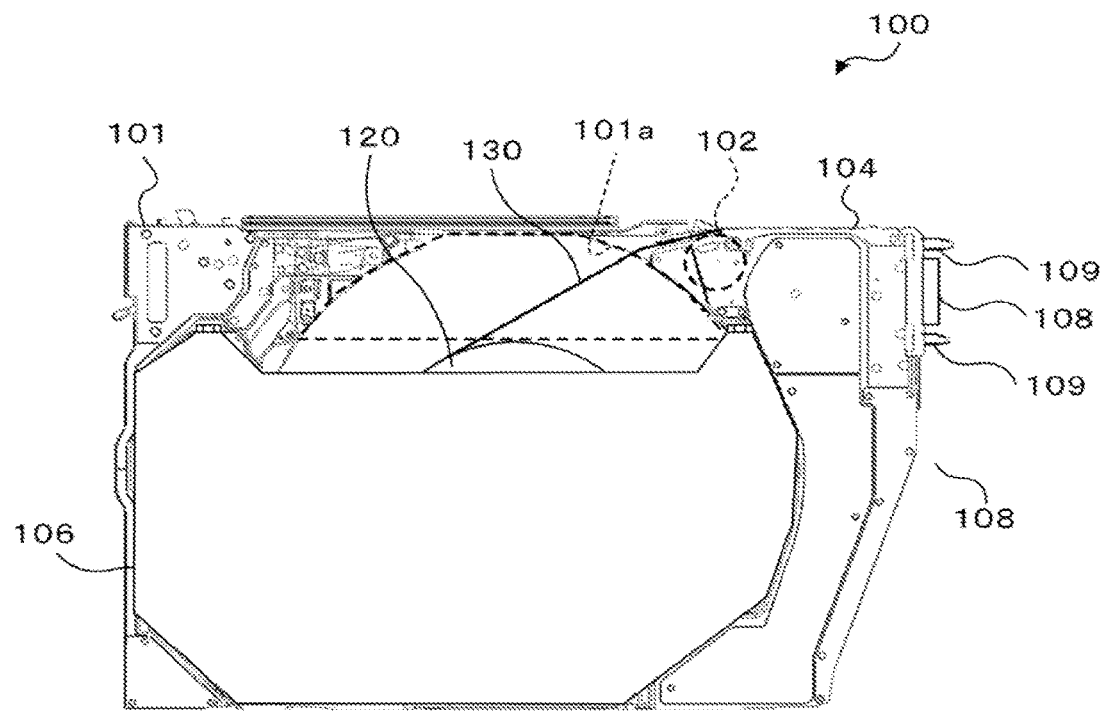
FIG. 3 is a schematic configuration diagram of feeder 100.
Figure 4:
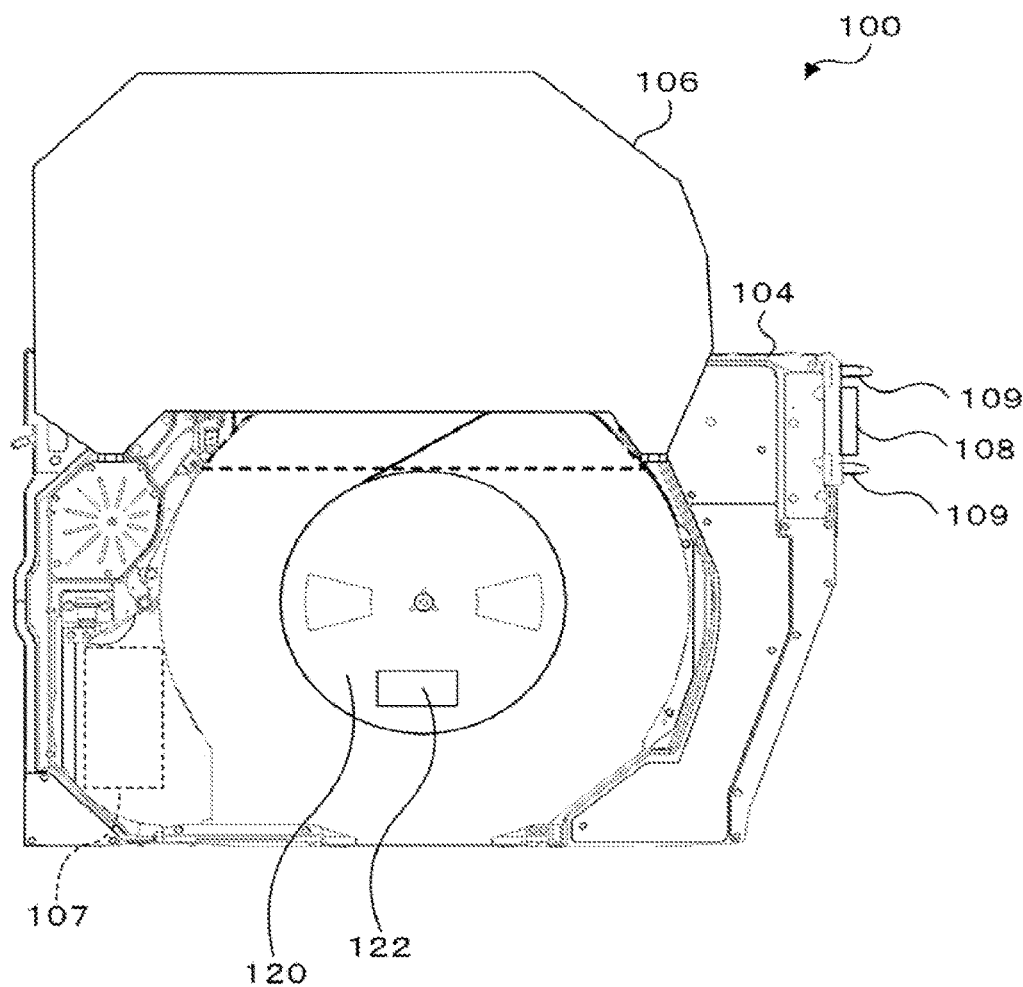
FIG. 4 is a schematic configuration diagram of feeder 100.

Here, FIGS. 2 to 4 are schematic configuration diagrams of feeder 100. In feeder 100, reel 120 on which tape 130 accommodating the component is wound is attached to main body 101 so as to be attached and detached, and the component is supplied by feeding out tape 130. Label 122 that indicates the ID of reel 120, information on the component type accommodated by tape 130, and the like is attached to reel 120. Tape 130 is configured to include bottom tape in which multiple cavities (recessed portions) are formed at predetermined intervals in the longitudinal direction and components are accommodated in each cavity, and cover tape that is adhered so as to cover the surface of bottom tape. Engagement holes are formed in tape 130 at equal intervals in the longitudinal direction.

Feeder 100 is provided with main body 101, tape feeding section 102, tape guide 104, reel cover 106, collecting section 107, connector 108, positioning pin 109, and control section (not illustrated). FIG. 2 omits reel cover 106, FIG. 3 illustrates reel cover 106 in a closed state, and FIG. 4 illustrates reel cover 106 in an opened state.

Tape feeding section 102 is provided with a sprocket in which a protrusion is provided on an outer periphery for engaging with an engagement hole of tape 130, and motor 103 (refer to FIG. 6) for driving the sprocket. In a state where tape 130 is engaged with the sprocket, tape feeding section 102 intermittently rotates the sprocket by the forward rotation of the motor to pitch-feed tape 130 to the supply position of the component. In addition, tape feeding section 102 can rewind tape 130 toward reel 120 side by the reverse rotation of the motor. In main body 101, opening 101a is formed in an upper part of a rear surface plate on which reel cover 106 is not provided. Tape guide 104 is provided on the upper part of main body 101 to guide the bottom tape from which the cover tape is peeled to a supply position of a component. Reel cover 106 is provided so as to be openable and closable on an upper part side in main body 101, covers reel 120 in a closed state in FIG. 3 so as not to fall off, and exposes reel 120 in an opened state in FIG. 4 so as to be attached and detached. Collecting section 107 collects the cover tape peeled from tape 130. Collecting section 107 is configured as, for example, a collection box that collects the cover tape while pulling in by the rotation of a pair of gears, a collection drum that collects the cover tape while winding the cover tape, or the like. Connector 108 and positioning pin 109 are provided so as to protrude from an end surface of main body 101. Although not illustrated, a connector to which connector 108 can be connected and a pin hole into which positioning pin 109 can be engaged are provided on a feeder base such as mounting device 16 and feeder storage location 18. Therefore, when feeder 100 is mounted on the feeder base, connector 108 is connected to the connector of the feeder base, and positioning pin 109 is engaged with the pin hole. The control section (not illustrated) of feeder 100 can communicate with a control section or the like of mounting device 16 via the connection of the connector, and causes tape feeding section 102 so as to pitch-feed tape 130 in response to a component supply instruction.

As illustrated in FIG. 1, preparation line 20 is provided with automatic reel storage 22, reel storage location 25, feeder storage 26, feeder storage location 28, loader 29, and reel attaching/detaching device 30. Automatic reel storage 22 is configured to automatically store reel 120 placed on cradle 22a provided in front and store reel 120 in the storage, or to automatically take out necessary reel 120 from the storage and place reel 120 on cradle 22a. These reels 120 are accommodated in a state where a distal end of tape 130 is temporarily fixed by a temporary fixing tape. AGV 4 or the operator returns feeder 100 collected from mounting line 10 to feeder storage location 28, or takes out necessary feeder 100 from feeder storage location 28 to accommodate feeder 100 in feeder storage location 18 of mounting line 10. Loader 29 moves front of multiple feeder storages 26 and front of feeder storage location 28, takes out feeder 100 from feeder storage location 28 to be accommodated in feeder storage 26, or takes out feeder 100 from feeder storage 26 to be accommodated in feeder storage location 28. In addition, loader 29 transfers feeder 100 as an attaching/detaching target of reel 120 into reel attaching/detaching device 30. In FIG. 1, as reel storage location 25, two storage locations of a storage location for used (component shortage) reel 120 and a storage location for new reel 120 are exemplified.

Figure 5:
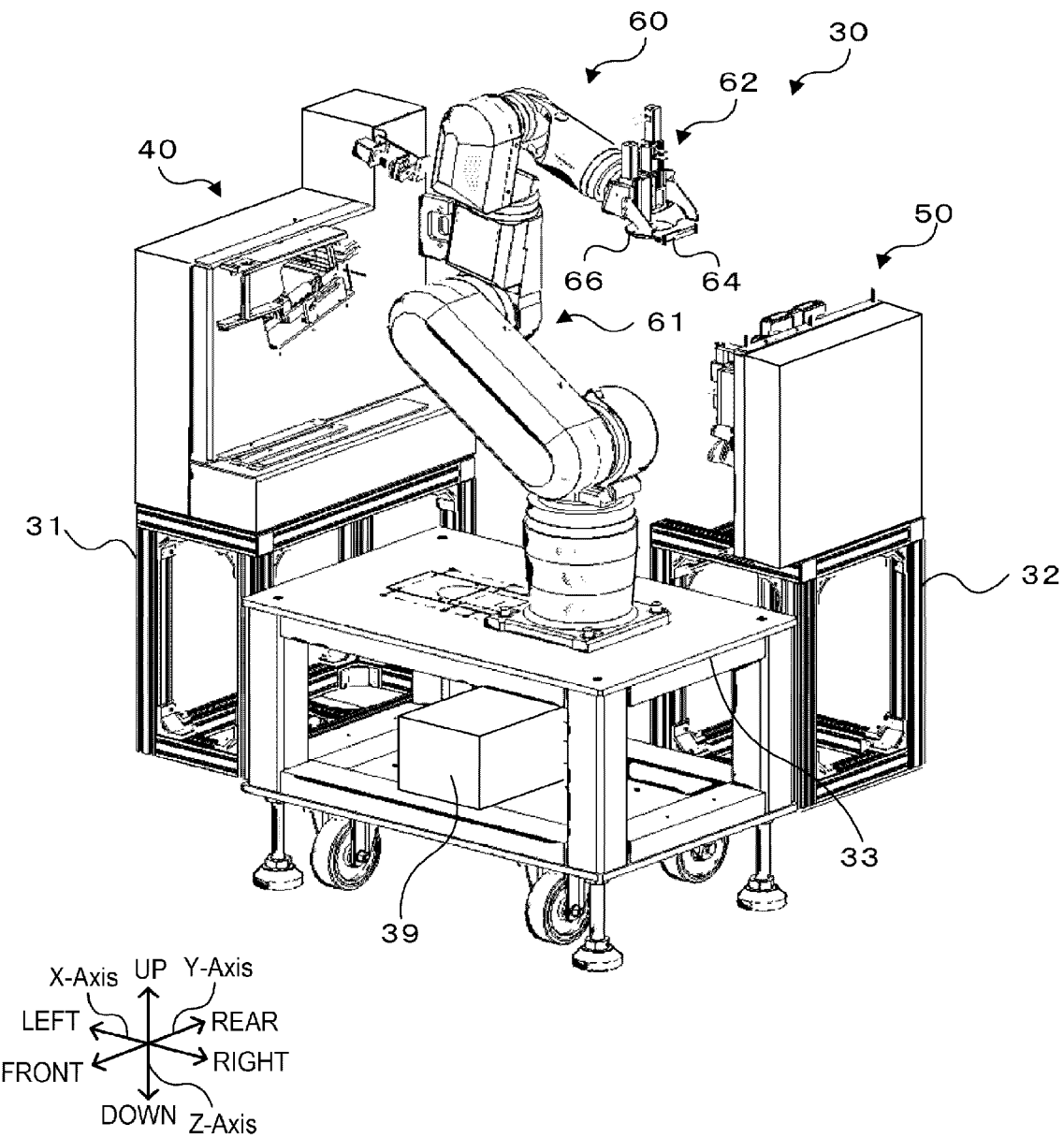
FIG. 5 is a schematic configuration diagram of reel attaching/detaching device 30.
Figure 6:
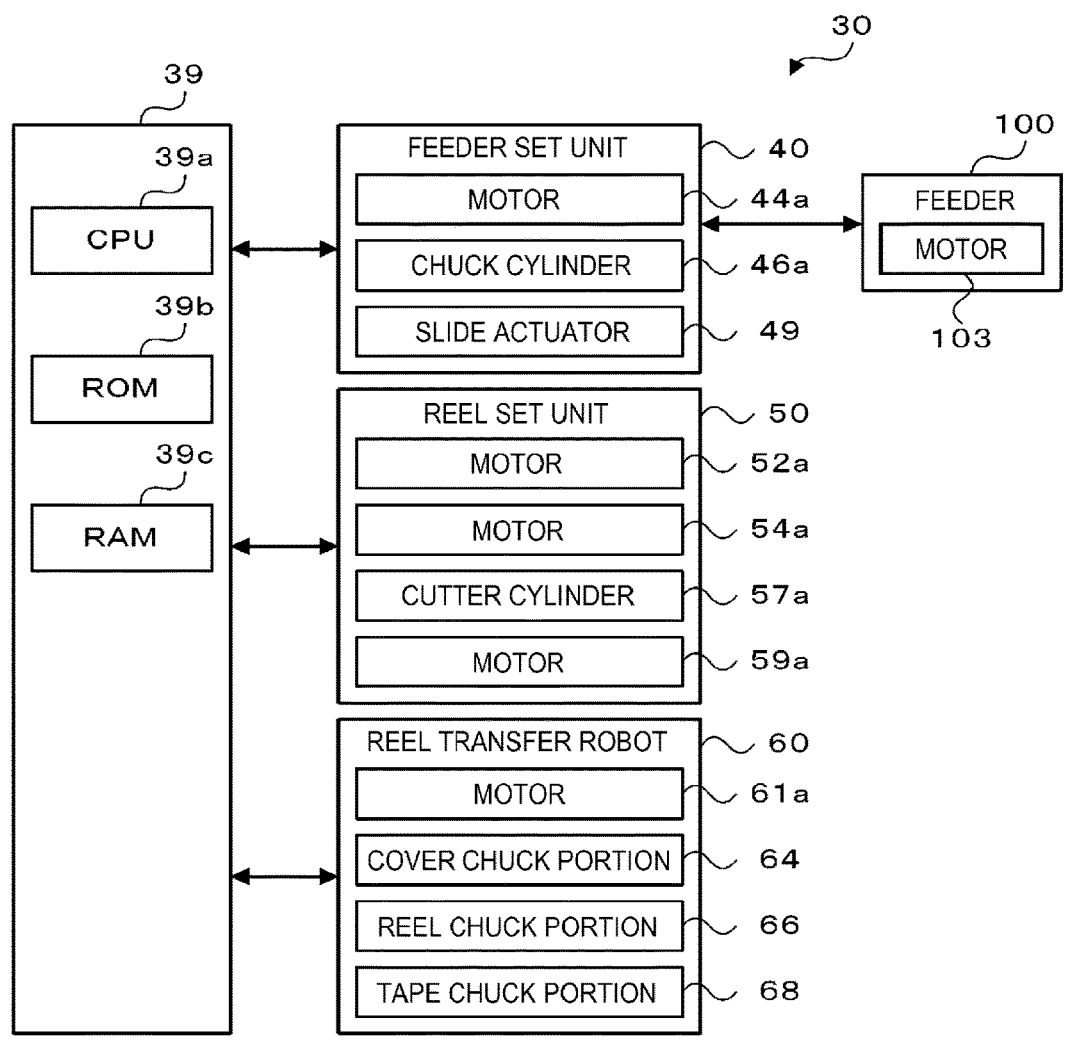
FIG. 6 is a block diagram illustrating an electrical connection relationship of reel attaching/detaching device 30.

As illustrated in FIGS. 5 and 6, reel attaching/detaching device 30 is provided with feeder set unit 40 provided on base plate 31, reel set unit 50 provided on base plate 32, reel transfer robot 60 provided on base plate 33, and control device 39 provided on base plate 33. Each unit may be provided on a common base plate. In addition, although not illustrated, reel attaching/detaching device 30 may be provided with a camera capable of capturing an image of label 122 of reel 120 attached to feeder 100.

Figure 7:
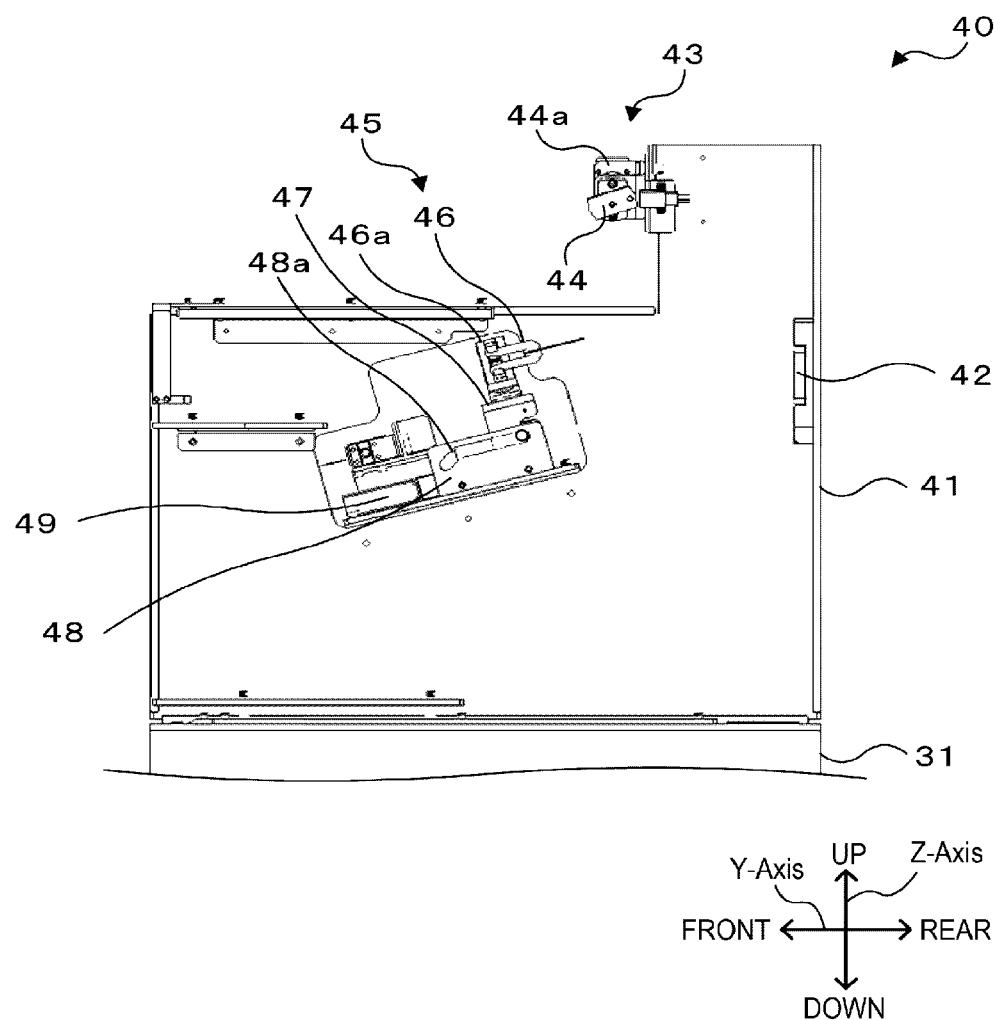
FIG. 7 is a schematic configuration diagram of feeder set unit 40.

Feeder set unit 40 is a unit on which feeder 100 as an attaching/detaching target of reel 120 is transferred by loader 29 on base 41 of base plate 31, and feeder 100 is set in the same predetermined orientation (refer to FIG. 1) as when used in mounting device 16 or the like, that is, when supplying the component. As illustrated in FIG. 7, feeder set unit 40 is provided with connector 42 to which connector 108 of feeder 100 can be connected and a pin hole into which positioning pin 109 can be engaged in base 41. Therefore, when feeder 100 is set in feeder set unit 40, control device 39 can communicate with the control section of feeder 100 via the connection between connector 108 and connector 42 to control tape feeding section 102.

In addition, feeder set unit 40 is provided with cover support portion 43 and tape feeding section 45. Cover support portion 43 is provided with support piece 44 that supports reel cover 106 in the opened state, and motor 44a that pivots support piece 44. When reel cover 106 is in an open state, support piece 44 is pivoted by approximately 90 degrees from the initial position by a drive of motor 44a. Therefore, cover support portion 43 is engaged with support piece 44 so as to be hooked on an end portion of reel cover 106 to support reel cover 106 in an open state. In addition, cover support portion 43 releases the support of reel cover 106 by returning support piece 44 to the initial position by the drive of motor 44a. Cover support portion 43 supports reel cover 106 in the opened state at a position where reel cover 106 is detached from the operation range of reel transfer robot 60 required for attaching/detaching reel 120 to and from feeder 100.

Tape feeding section 45 is provided with chuck 46, chuck cylinder 46a, chuck base 47, slide guide 48, and slide actuator 49. Chuck 46 is configured to be opened and closed by the operation of chuck cylinder 46a to grip tape 130. Chuck 46 and chuck cylinder 46a are provided on chuck base 47. Chuck base 47 is movable in the left-right direction (X-axis direction) and along the feeding direction of tape 130 by a drive of slide actuator 49 configured to include a motor, a cylinder, and the like. When chuck 46 moves from the left to the right (from rear to front of the drawing) together with chuck base 47, chuck 46 can enter feeder 100 through opening 101a and grip tape 130 between reel 120 and tape feeding section 102. In addition, guide hole 48a is formed in slide guide 48 so as to be inclined along the feeding direction of tape 130. In a state where chuck 46 grips tape 130, when chuck base 47 slides while being guided by guide hole 48a by the drive of slide actuator 49, tape 130 can be fed along the feeding direction.

Figure 8:
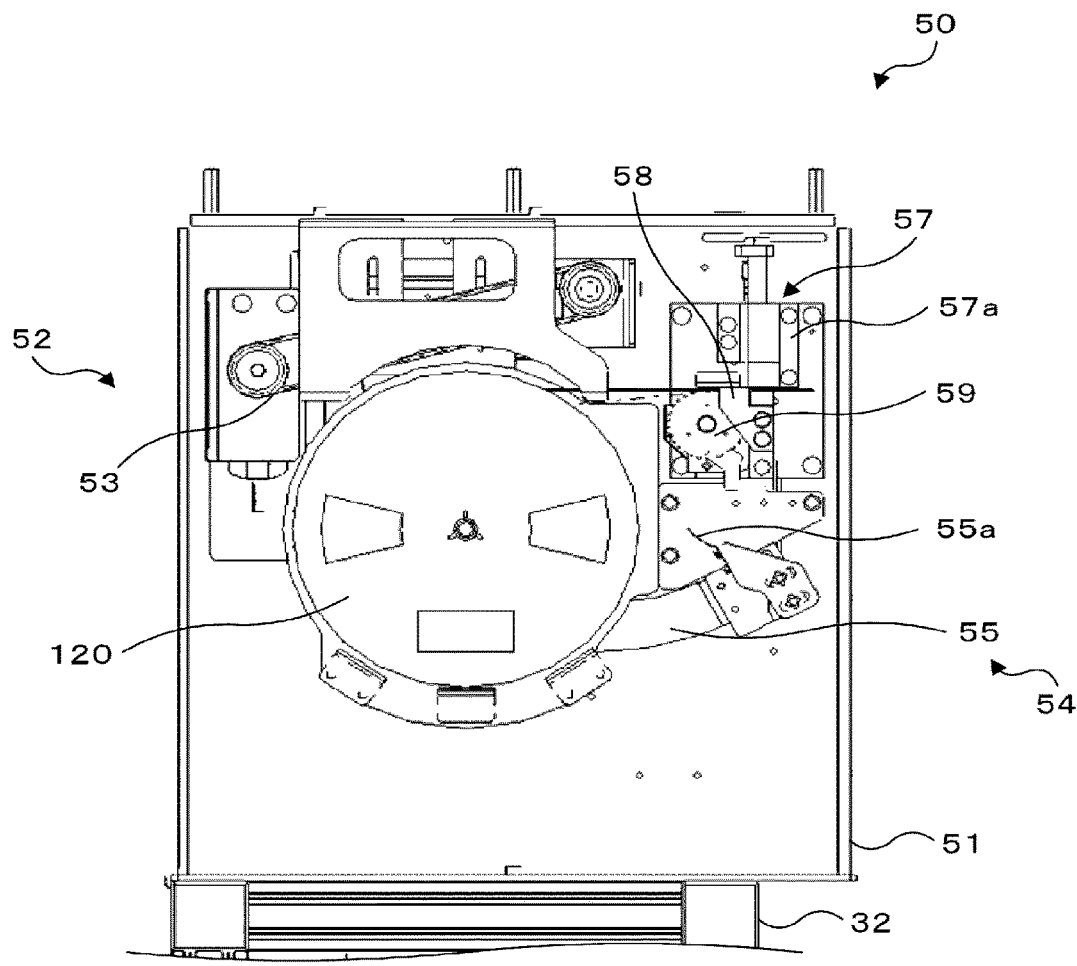
FIG. 8 is a schematic configuration diagram of reel set unit 50.

Reel set unit 50 is a unit on which reel 120 as an attachment target of feeder 100 is transferred to base 51 on base plate 32, and reel 120 is set in the same predetermined orientation as when used in mounting device 16 or the like, that is, when the component is supplied. As illustrated in FIG. 8, reel set unit 50 is provided with rotation section 52 which rotates reel 120, peeling section 54 which peels off a distal end of tape 130 temporarily fixed to reel 120, and cutting section 57 which cuts the distal end of tape 130. Rotation section 52 is provided with motor 52a (refer to FIG. 6) attached to base 51 and pulley 53, and transmits the driving force of motor 52a via pulley 53 to rotate reel 120. Peeling section 54 is provided with motor 54a (refer to FIG. 6) attached to base 51, actuating arm 55 operated by a drive of motor 54a so as to approach reel 120, and peeling piece 55a attached to a distal end of actuating arm 55. When reel 120 rotates in a state where actuating arm 55 approaches reel 120 and peeling piece 55a abuts on tape 130, peeling section 54 can peel off the distal end of tape 130 by hooking the temporary fixing tape by peeling piece 55a. Cutting section 57 is provided with cutter cylinder 57a for lifting and lowering a cutter blade, cutting base 58, sprocket 59 having a protrusion formed on an outer periphery thereof for engaging with an engagement hole in tape 130, and motor 59a for rotating sprocket 59. Cutting section 57 feeds tape 130 on cutting base 58 by rotating sprocket 59 by a drive of motor 59a, and cuts tape 130 fed to the cutting position by the cutter blade by operating cutter cylinder 57a.

Figure 10A:
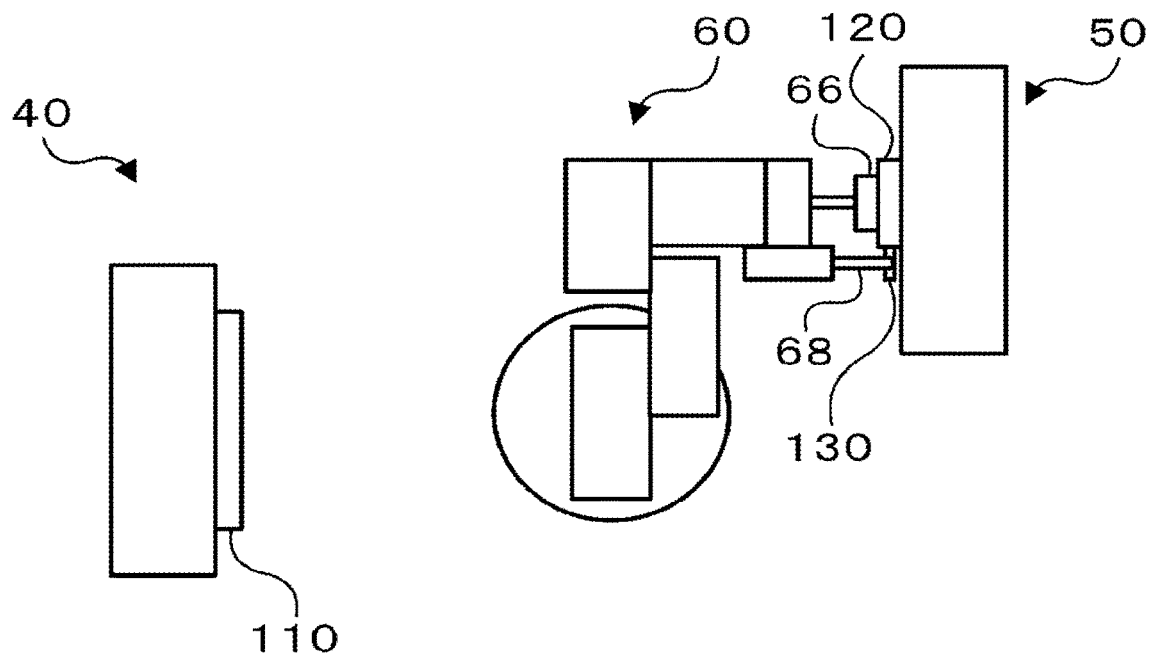
FIG. 10 is an explanatory view illustrating a state of transferring reel 120 in the reel attachment process.
Figure 10B:
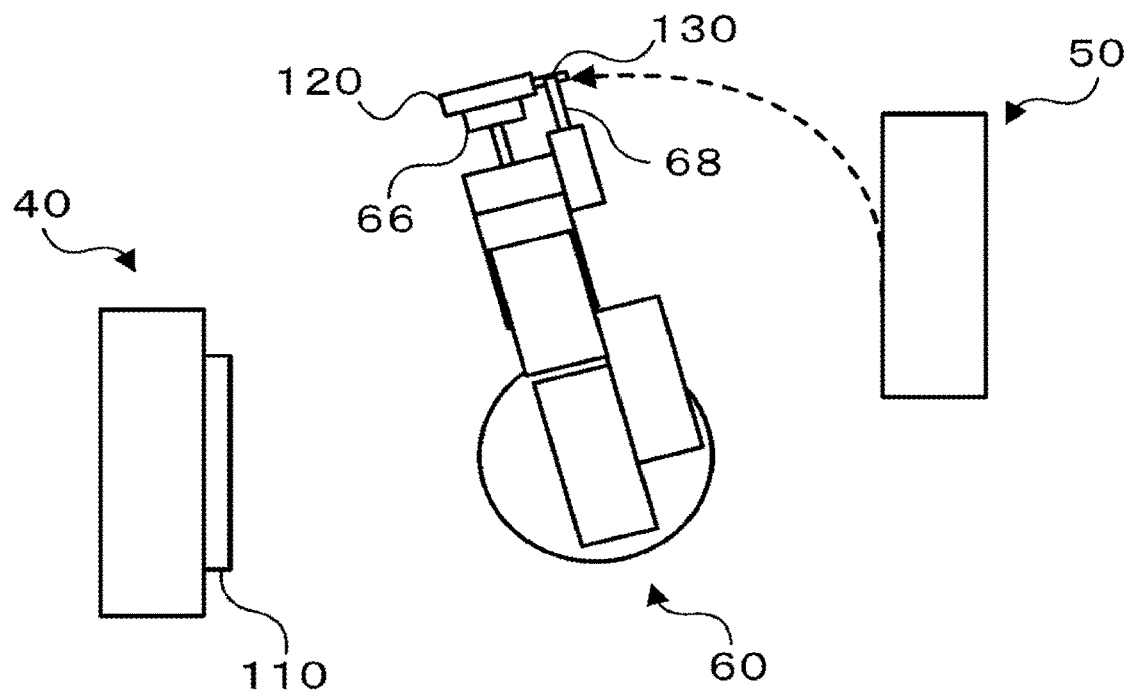

As illustrated in FIG. 5, reel transfer robot 60 is provided with vertical articulated robot arm 61 disposed on base plate 33, multiple motors 61a (refer to FIG. 6) for driving the joints of each arm of robot arm 61, an encoder (not illustrated) for measuring the rotation angles of each joint, and end effector 62 attached to a distal end of the arm. End effector 62 is provided with cover chuck portion 64 for chucking reel cover 106 of feeder 100, reel chuck portion 66 for chucking reel 120, and tape chuck portion 68 (refer to FIGS. 6 and 10) for chucking tape 130 of reel 120. Reel transfer robot 60 can open reel cover 106 by operating robot arm 61 upward in a state where cover chuck portion 64 grips reel cover 106 of feeder 100 set in feeder set unit 40. In addition, reel transfer robot 60 can set reel 120 in reel set unit 50 by operating robot arm 61 in a state where reel chuck portion 66 grips reel 120 placed on cradle 22a or reel storage location 25. In addition, reel transfer robot 60 can set reel 120 in feeder set unit 40 by detaching reel 120 set in reel set unit 50 while gripping the distal end of tape 130 by reel chuck portion 66 and tape chuck portion 68, and operating robot arm 61. Robot arm 61 of reel transfer robot 60 operates so as to transfer reel 120 while holding a predetermined orientation of reel 120 between feeder set unit 40 and reel set unit 50.

Control device 39 is provided with CPU 39a, ROM 39b, RAM 39c, and the like. Status information and the like are inputted to control device 39 from each unit of reel attaching/detaching device 30 or reel transfer robot 60, and status information on automatic reel storage 22 and loader 29, instructions for attaching/detaching reel 120 and the like are inputted to control device 39 from management device 2. Control device 39 attaches/detaches reel 120 to and from feeder 100 set in feeder set unit 40 while outputting control signals to each unit of reel attaching/detaching device 30 and reel transfer robot 60 based on such information and the attaching/detaching instructions.

Figure 9:
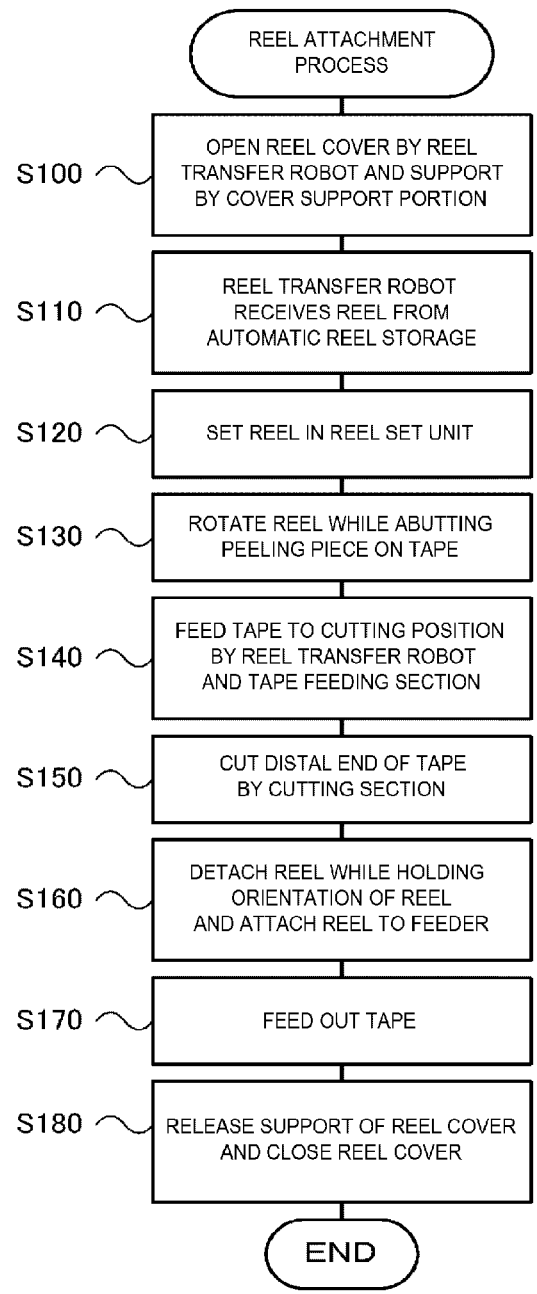
FIG. 9 is a flowchart illustrating an example of a reel attachment process.

The following is a description of the operation of reel attaching/detaching device 30 configured in this manner. FIG. 9 is a flowchart illustrating an example of a reel attachment process, and FIG. 10 is an explanatory view illustrating a state of transferring reel 120 in the reel attachment process. FIG. 10 is an explanatory view as viewed from above. The process in FIG. 9 is executed by control device 39 in a case where feeder 100 as an attachment target of reel 120 is set in feeder set unit 40. First, control device 39 causes reel transfer robot 60 and cover support portion 43 of feeder set unit 40 so as to open and support reel cover 106 of feeder 100 (S100). As described above, cover support portion 43 supports reel cover 106 in the opened state so as not to interfere with the attaching/detaching operations of reel 120 by reel transfer robot 60. Next, control device 39 controls reel transfer robot 60 so that reel transfer robot 60 receives reel 120 as an attachment target from cradle 22a of automatic reel storage 22 (S110), and sets reel 120 in reel set unit 50 (S120).

Subsequently, control device 39 causes reel set unit 50 so as to rotate reel 120 while abutting peeling piece 55a of peeling section 54 on tape 130 (S130). As a result, reel set unit 50 can peel off the distal end of temporarily fixed tape 130. Since the distal end of peeled tape 130 protrudes outward from reel 120 due to the repulsive force, tape 130 is brought into a state where a predetermined amount is fed out from reel 120. Control device 39 controls reel transfer robot 60 and reel set unit 50 so that tape chuck portion 68 grips the distal end of tape 130 protruding outward from reel 120 and feeds tape 130 to the cutting position of cutting section 57 (S140), and cuts the distal end of tape 130 fed to the cutting position (S150). By the distal end process, the temporary fixing tape is removed.

Figure 10C:
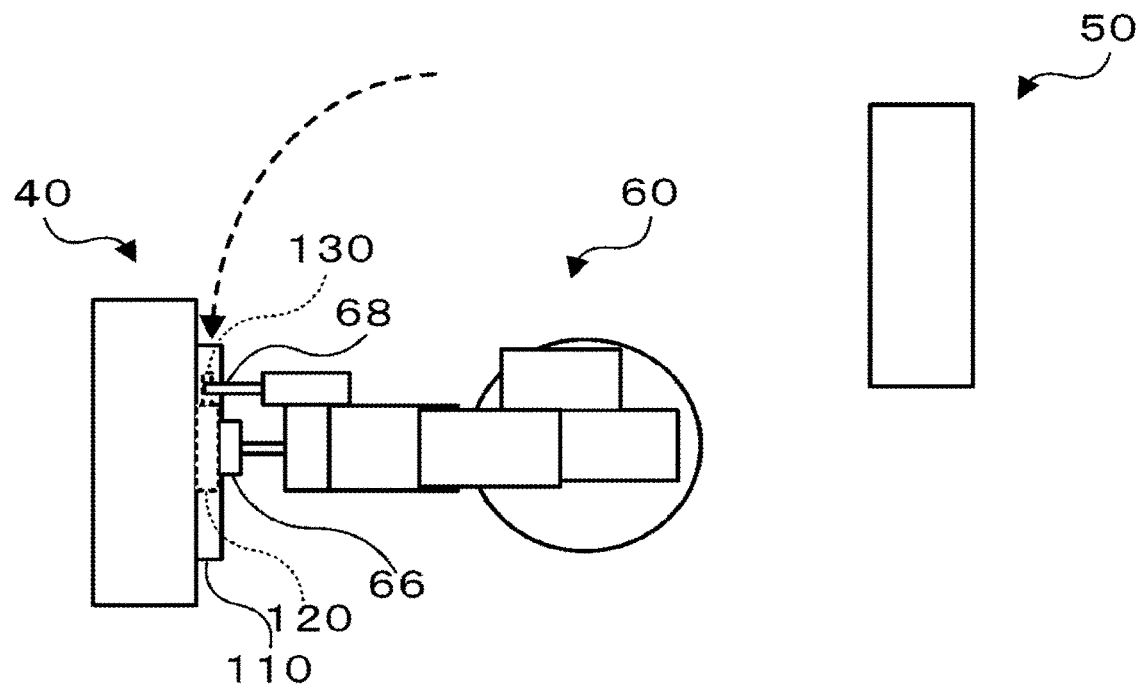

Control device 39 detaches reel 120 from reel set unit 50 while holding the orientation of reel 120, and causes reel transfer robot 60 so as to attach reel 120 to feeder 100 set in feeder set unit 40 (S160). In S160, reel transfer robot 60 pivots while holding a predetermined orientation of reel 120 (FIG. 10B) in a state where tape chuck portion 68 grips a distal end of cut tape 130 and reel chuck portion 66 grips reel 120 in a predetermined orientation (FIG. 10A), and moves reel 120 in a predetermined orientation to feeder 100 to attach reel 120 to feeder 100 (FIG. 10C). As a result, since reel 120 is not significantly tilted from the predetermined orientation, it is possible to prevent the orientation of the component in tape 130 from significantly changing or the component from falling off from tape 130. When reel 120 is attached to feeder 100, control device 39 controls feeder set unit 40 so that chuck 46 of tape feeding section 45 grips tape 130 gripped by tape chuck portion 68 of reel transfer robot 60, and controls reel transfer robot 60 so that tape chuck 68 releases tape 130.

When reel 120 is set in feeder 100 in this manner, control device 39 causes feeder set unit 40 so as to feed out tape 130 (S170). In S170, control device 39 controls tape feeding section 45 so that chuck 46 of tape feeding section 45 feeds the distal end of tape 130 to tape feeding section 102 of feeder 100 while gripping tape 130. In addition, control device 39 controls tape feeding section 102 so that tape feeding section 102 of feeder 100 rotates forward and feeds the distal end of tape 130 to a predetermined position.

Control device 39 causes feeder set unit 40 and reel transfer robot 60 so as to release the support by cover support portion 43 and close reel cover 106 (S180), and ends the reel attachment process. In a case where reel attaching/detaching device 30 is provided with a camera capable of capturing an image of label 122 of reel 120, control device 39 may cause the camera to capture an image of label 122 before closing reel cover 106, and may perform image processing on the captured image to recognize the information on label 122. Based on the recognized information, control device 39 may confirm whether correct reel 120 is attached, register the attachment in association with feeder 100, or transmit the recognized information to management device 2 together with the notification that the attachment of reel 120 is completed.

In addition, reel attaching/detaching device 30 can perform a detachment process of reel 120 from feeder 100 set in feeder set unit 40. In the detachment process, control device 39 first causes tape feeding section 102 of feeder 100 so as to rewind tape 130. The rewinding of tape 130 is performed, for example, until a part to which components have already been supplied is rewound on reel 120. Control device 39 may drive tape feeding section 45 to rewind tape 130. In addition, reel chuck portion 66 of reel transfer robot 60 may be configured to be rotatable, and control device 39 may cause reel transfer robot 60 so as to rotate reel 120 in the reverse direction according to the reverse rotation of tape feeding section 102. In addition, feeder set unit 40 may be provided with a cutting section, and control device 39 may cause the cutting section to cut tape 130 at a part to which components have been supplied when tape 130 is rewound.

Next, control device 39 causes reel transfer robot 60 so as to detach reel 120 from feeder 100 and transfer reel 120 to a predetermined position. In a case where there are remaining components in tape 130, reel transfer robot 60 transfers reel 120 to, for example, reel set unit 50 in a predetermined orientation, similarly to FIG. 10. Reel set unit 50 may be provided with a temporary fixing portion that fixes tape 130 with a temporary fixing tape. In this case, control device 39 causes the temporary fixing portion so as to temporarily fix tape 130 of reel 120 set in reel set unit 50. Alternatively, feeder set unit 40 may be provided with a temporary fixing portion. Control device 39 may control reel transfer robot 60 so that reel 120 on which the temporary fixing is completed is transferred to cradle 22a of automatic reel storage 22. When there are no remaining components in tape 130, control device 39 may control reel transfer robot 60 so that reel 120 is transferred to used reel storage location 25. Reel transfer robot 60 may discharge reel 120 from a discharge port formed on the upper plate of base plate 33.

Here, correspondences between constituent elements of the present embodiment and constituent elements of the present disclosure will be clarified. Reel attaching/detaching device 30 of the present embodiment corresponds to the reel attaching/detaching device of the present disclosure, feeder set unit 40 corresponds to the feeder set unit, reel set unit 50 corresponds to the reel set unit, reel transfer robot 60 corresponds to the transfer robot, and control device 39 corresponds to the control device. Tape feeding section 45 corresponds to the feeding section. Peeling section 54 corresponds to the peeling section, and cutting section 57 corresponds to the cutting section. Reel cover 106 corresponds to the opening and closing cover. In addition, preparation line 20 corresponds to the feeder preparation system, feeder storage 26 corresponds to the feeder storage section, loader 29 corresponds to the feeder preparation device, and automatic reel storage 22 corresponds to the reel storage section.

In reel attaching/detaching device 30 described above, reel transfer robot 60 detaches reel 120 having a predetermined orientation from reel set unit 50, and transfers and attaches reel 120 to feeder 100 set in feeder set unit 40 while holding a predetermined orientation. Therefore, since it is not necessary to tilt reel 120 and feeder 100, and it is possible to prevent the orientation of the component accommodated in tape 130 from changing significantly or the component from falling off, it is possible to more appropriately attach/detach reel 120. In addition, even in a case where the size such as the width of tape 130 (reel 120) differs depending on the type of component to be accommodated, the attaching/detaching of reel 120 can be easily and appropriately performed by changing the operation program and parameters of robot arm 61 of reel transfer robot 60.

In addition, since reel transfer robot 60 detaches reel 120 from reel set unit 50 and attaches reel 120 to feeder 100 while holding the distal end of tape 130, and tape feeding section 102 of feeder 100 and tape feeding section 45 of feeder set unit 40 feed the distal end of tape 130 to a predetermined position, it is possible to appropriately perform the distal end process of tape 130. In addition, since the temporary fixing tape of tape 130 can be peeled off by peeling section 54, it is possible to more appropriately perform the distal end process of tape 130. In addition, since cover support portion 43 supports reel cover 106 in the opened state at a position that does not interfere with the operation of reel transfer robot 60, the attaching/detaching of reel 120 can be efficiently performed.

It is needless to say that the present disclosure is not limited to the embodiments described above, and various forms can be implemented within the technical scope of the present disclosure.

For example, in the above embodiment, the one in which reel cover 106 is attached to the upper part side of feeder 100 so as to be openable and closable is exemplified; however, the configuration is not limited to this, reel cover 106 may be attached to feeder 100 so as to be openable and closable, or may be attached to the lower edge, or the opening and closing direction may be the left-right direction.

In the above embodiment, feeder 100 is set in feeder set unit 40 so as to be able to drive tape feeding section 102 of feeder 100; however, the configuration is not limited to this, and feeder 100 may be set so as to not be able to drive tape feeding section 102. In addition, tape feeding section 45 is provided in feeder set unit 40; however, the configuration is not limited to this, tape feeding section 45 may be provided in a place other than feeder set unit 40, and, for example, may be provided in reel transfer robot 60. That is, feeder set unit 40 may be any unit as long as the unit is set in a predetermined orientation when feeder 100 supplies components.

In the above embodiment, reel set unit 50 is provided with rotation section 52, peeling section 54, and cutting section 57, but any or all of these sections may be provided separately from reel set unit 50. That is, reel set unit 50 may be any unit as long as reel 120 is set in a predetermined orientation. Any of rotation section 52, peeling section 54, and cutting section 57 may be provided on end effector 62 of reel transfer robot 60.

In the above embodiment, reel transfer robot 60 is provided with cover chuck portion 64 and tape chuck portion 68, but need not be provided with these portions. That is, reel transfer robot 60 may be configured to transfer reel 120 between feeder set unit 40 and reel set unit 50 while holding a predetermined orientation by reel chuck portion 66. Feeder set unit 40 may be configured to be able to open and close reel cover 106.

In the above embodiment, in addition to reel attaching/detaching device 30, preparation line 20 (preparation system) including loader 29 for setting feeder 100 in feeder set unit 40, automatic reel storage 22 to which reel transfer robot 60 transfers reel 120, and the like is exemplified; however, the configuration is not limited to this. Reel attaching/detaching device 30 may be individually disposed, and the set of feeder 100 may be performed by another device such as AGV or an operator, or reel transfer robot 60 may transfer reel 120 to and from another device such as AGV.

Here, the reel attaching/detaching device of the present disclosure may be configured as follows. In the reel attaching/detaching device according to the present disclosure, the device may further include a feeding section disposed in either the feeder set unit or the transfer robot and configured to feed the tape of the reel mounted on the feeder to a side of the feed-out section, in which in the feeder set unit, the feeder may be set such that the feed-out section is drivable, the reel set unit may be configured to rotate the reel, the transfer robot may be configured to hold a distal end of the tape, and when the reel is set in the reel set unit, the control device may cause the reel set unit so as to rotate the reel until the tape is fed out in a predetermined amount, cause the transfer robot so as to detach the reel and attach the reel to the feeder while holding the distal end of the tape, and control the feed-out section and the feeding section so that the distal end of the tape reaches a predetermined position. As a result, in the attachment of the reel using the transfer robot, the distal end process of the tape can be appropriately performed.

In the reel attaching/detaching device of the present disclosure, the reel set unit may include a peeling section configured to peel the distal end of the tape temporarily fixed to the reel and a cutting section configured to cut the distal end of the tape, and when the reel is set in the reel set unit, the control device may control the reel set unit so that the distal end of the tape is peeled off by the peeling section, thereafter the tape is fed out in the predetermined amount, and the distal end of the tape is cut by the cutting section. As a result, even in the reel in a state where the distal end of the tape is temporarily fixed, it is possible to appropriately perform the distal end process.

In the reel attaching/detaching device of the present disclosure, the feeder may include an opening and closing cover that exposes the reel in an open state so as to be attached and detached, the transfer robot may be configured to open and close the opening and closing cover of the feeder set in the feeder set unit, and the feeder set unit may include a support section that supports the opening and closing cover in the open state at a position that does not interfere with an operation of the transfer robot. As a result, it is possible to prevent the opening and closing cover from interfering with the transfer of the reel, and to efficiently detach and attach the reel.

It is a gist that a feeder preparation system of the present disclosure includes any of the reel attaching/detaching device described above, a feeder preparation device configured to transfer the feeder between a feeder storage section storing multiple feeders and the feeder set unit, and to prepare the feeder as an attaching/detaching target of the reel, and a reel storage section configured to store multiple reels, in which the transfer robot is configured to transfer the reel between the reel storage section and the reel set unit. In the feeder preparation system of the present disclosure, since the reel is automatically attached/detached to and from the feeder by any reel attaching/detaching devices described above, the attaching/detaching of the reel can be more appropriately performed. In addition, since the preparation of the feeder and the preparation of the reel can also be automatically performed, the attaching/detaching of the reel to and from the feeder can be more efficiently performed.

Although the reel attaching/detaching device is used in the present disclosure, the device may be a reel attaching device that only attaches a reel or a reel detaching device that only detaches a reel. For example, in the case of a reel detaching device, when the feeder is set in the feeder set unit, the control device may cause the transfer robot so as to detach the reel from the feeder and set the reel in the reel set unit.

INDUSTRIAL APPLICABILITY

The present disclosure can be used in the manufacturing industry of component mounting systems and the like.

REFERENCE SIGNS LIST 1 component mounting system, 2 management device, 4 AGV, 10 mounting line, 12 printing device, 14 printing inspection device, 16 mounting device, 18 feeder storage location, 19 loader, 20 preparation line, 22 automatic reel storage, 22a cradle, 25 reel storage location, 26 feeder storage, 28 feeder storage location, 29 loader, 30 reel attaching/detaching device, 31, 32, 33 base plate, 39 control device, 39a CPU, 39b ROM, 39c RAM, 40 feeder set unit, 41 base, 42 connector, 43 cover support portion, 44 support piece, 44a motor, 45 tape feeding section, 46 chuck, 46a chuck cylinder, 47 chuck base, 48 slide guide, 48a guide hole, 49 slide actuator, 50 reel set unit, 51 base, 52 rotation section, 52a motor, 53 pulley, 54 peeling section, 54a motor, 55 actuating arm, 55a peeling piece, 57 cutting section, 57a cutter cylinder, 58 cutting base, 59 sprocket, 59a motor, 60 reel transfer robot, 61 robot arm, 61a motor, 62 end effector, 64 cover chuck portion, 66 reel chuck portion, 68 tape chuck portion, 100 feeder, 101 main body, 101a opening, 102 tape feeding section, 103 motor, 104 tape guide, 106 reel cover, 107 collecting section, 108 connector, 109 positioning pin, 120 reel, 122 label, 130 tape

The invention claimed is:

1. A reel attaching and detaching device that attaches and detaches a reel on which a tape accommodating a component is wound to and from a feeder which feeds out the tape by a drive of a feed-out section and supplies the component, the reel attaching and detaching device comprising:

a feeder set unit configured to set the feeder in a feeder predetermined orientation in which the feeder supplies the component;

a reel set unit configured to set the reel in a reel predetermined orientation in which the reel supplies the component when mounted in the feeder;

a transfer robot configured to transfer the reel between the feeder set unit and the reel set unit while holding the reel in the reel predetermined orientation, the transfer robot including a first chuck to hold a body of the reel and a second chuck to hold a distal end of the tape; and a control device configured to control the transfer robot so that the reel is detached from the reel set unit and the reel is attached to the feeder set in the feeder set unit.

2. The reel attaching and detaching device according to claim 1, further comprising:

a feeding section disposed in either the feeder set unit or the transfer robot and configured to feed the tape of the reel mounted on the feeder to a side of the feed-out section, wherein in the feeder set unit, the feeder is set such that the feed-out section is drivable, the reel set unit is configured to rotate the reel, and when the reel is set in the reel set unit, the control device causes the reel set unit so as to rotate the reel until the tape is fed out in a predetermined amount, causes the transfer robot so as to detach the reel and attach the reel to the feeder while holding the distal end of the tape, and controls the feed-out section and the feeding section so that the distal end of the tape reaches a predetermined position.

3. The reel attaching and detaching device according to claim 2, wherein the reel set unit includes a peeling section configured to peel the distal end of the tape temporarily fixed to the reel and a cutting section configured to cut the distal end of the tape, and when the reel is set in the reel set unit, the control device controls the reel set unit so that the distal end of the tape is peeled off by the peeling section, thereafter the tape is fed out in the predetermined amount, and the distal end of the tape is cut by the cutting section.

4. The reel attaching and detaching device according to claim 1, wherein the feeder includes an opening and closing cover that exposes the reel in an open state so as to be attached and detached, the transfer robot is configured to open and close the opening and closing cover of the feeder set in the feeder set unit, and the feeder set unit includes a support section that supports the opening and closing cover in the open state at a position that does not interfere with an operation of the transfer robot.

5. A feeder preparation system comprising:

the reel attaching and detaching device according to claim 1;

a feeder preparation device configured to transfer the feeder between a feeder storage section storing multiple feeders and the feeder set unit, and to prepare the feeder as an attaching/detaching target of the reel; and a reel storage section configured to store multiple reels, wherein the transfer robot is configured to transfer the reel between the reel storage section and the reel set unit.

* * * * *